(12) United States Patent
Schwinke

(10) Patent No.: US 7,031,713 B2
(45) Date of Patent: Apr. 18, 2006

(54) METHOD OF REDUCING BLOCKING FOR CELLULAR PHONES

(75) Inventor: Steven P. Schwinke, Plymouth, MI (US)

(73) Assignee: General Motors Corporation, Detroit, MI (US)

( * ) Notice: Subject to any disclaimer, the term of this patent is extended or adjusted under 35 U.S.C. 154(b) by 561 days.

(21) Appl. No.: 09/970,626

(22) Filed: Oct. 4, 2001

(65) Prior Publication Data

US 2003/0069019 A1 Apr. 10, 2003

(51) Int. Cl.
*H04Q 7/20* (2006.01)

(52) U.S. Cl. .................... 455/445; 455/466; 455/450; 455/422; 455/437; 370/329; 370/332; 370/333; 370/431

(58) Field of Classification Search .............. 455/404.1, 455/422.1, 434, 448, 450, 453, 454, 455, 455/509, 515, 552.1, 521, 445, 466, 437, 455/409, 452, 525, 561, 456, 422; 370/329, 370/332, 333, 431
See application file for complete search history.

(56) References Cited

U.S. PATENT DOCUMENTS

| | | | | |
|---|---|---|---|---|
| 5,442,807 A | * | 8/1995 | Takayama | 455/453 |
| 5,572,204 A | * | 11/1996 | Timm et al. | 340/988 |
| 5,839,075 A | * | 11/1998 | Haartsen et al. | 455/450 |
| 6,026,300 A | * | 2/2000 | Hicks | 455/434 |
| 6,073,005 A | * | 6/2000 | Raith et al. | 455/404.1 |
| 6,205,334 B1 | * | 3/2001 | Dent | 455/434 |
| 6,553,229 B1 | * | 4/2003 | Dent | 455/434 |
| 2002/0137489 A1 | * | 9/2002 | Dutta et al. | 455/404 |
| 2002/0196161 A1 | * | 12/2002 | Gould et al. | 340/988 |
| 2003/0211854 A1 | * | 11/2003 | Mazzara, Jr. | 455/458 |

* cited by examiner

*Primary Examiner*—Temica Beamer
*Assistant Examiner*—Julio Perez
(74) *Attorney, Agent, or Firm*—Cardinal Law Group

(57) ABSTRACT

The invention provides a method of bypassing a blocked voice channel of a mobile phone system. A call request is initiated from a mobile phone. A plurality of control channels of a first carrier is scanned, and the signal strength of each control channel is measured. Service access on the strongest control channel of the first carrier is requested. If a blocked signal indicating no availability of a voice channel on the strongest control channel of the first carrier is received, then a second strongest control channel of the first carrier is selected and service access on the second control channel is requested.

24 Claims, 3 Drawing Sheets

METHOD OF REDUCING BLOCKING FOR CELLULAR PHONES

FIELD OF THE INVENTION

This invention relates generally to a method for overcoming blocked calls in a mobile phone system.

BACKGROUND OF THE INVENTION

With increasing usage of mobile phones in our cities, on our campuses, on our roads, in our automobiles and in large congregations of people, the need for reducing the number of blocked calls for a cellular phone system becomes increasingly important. Even with more antennas, smaller cell sizes, and allocation of more frequency bands for cellular traffic, high concentrations of potential users of cellular phones create increased demand for cellular traffic on the existing systems. Allocations of mobile phone frequencies in the 900 MHz, 1900 MHz and higher bands, along with the 800 MHz band provide call capacity. Digital transmission technologies such as TDMA (time division multiple access), CDMA (code division multiple access) and GSM (global system for mobile telecommunications) further increase the call capacity and augment the analog cellular phone system. Digital phones are demanding higher transmission capacities to accommodate a larger number of personal communication services, such as voice mail, e-mail and Internet access.

Even with the proliferation of digital phones, call traffic continues on analog systems. Dual band phones, for example, allow usage of more than one band of frequencies. Dual mode phones convert to analog channels when digital channels are not available or are overloaded, placing high demand on the analog lines.

Demand for services becomes excessively high in specific urban markets, during special events, and during certain emergency situations. A traffic incident on a major freeway, for example, may lead to the need for high priority services for accident victims and emergency personnel, with the possibility of cellular phone calls being blocked while many individuals in backed up traffic chat or do business on their cellular phones.

It would be desirable, therefore, to provide a method for reducing the number of blocked phone calls and increasing cellular phone call capacity.

SUMMARY OF THE INVENTION

One aspect of the invention provides a method for bypassing a blocked voice channel of a mobile phone system. A call request may be initiated from a mobile phone. A plurality of control channels of a home carrier may be scanned. The signal strength of each scanned control channel may be measured and ranked. Service access may be requested using the control channel with the highest signal strength of the home carrier. In some instances, a blocked signal that indicates no availability of a voice channel may be received. In this situation, a second control channel of the home carrier with the second strongest signal may be selected, and a service access request may be made on the second control channel.

If a blocked signal that indicates no voice channel availability is received on the second strongest control channel, a next strongest control channel of the home carrier may be selected. Service access may be requested on this control channel. If service access is blocked and a voice channel is unavailable, service access on a next strongest control channel of the home carrier may be requested, until all control channels of the home carrier are exhausted.

The mobile phone system may be an analog cellular phone system, which may operate within a prescribed band between nominally 824 MHz and 894 MHz.

Services provided over the voice channel may include, for example, transmission of verbal communications, short messaging, paging and page responses, voice mail, electronic mail, call forwarding, caller identification, call waiting, conference calling, broadcast messages, voice band data, facsimile data, data transmission, modem access, direct access to computer networks, registration, authentication and access to emergency services.

In emergency situations, priority may be increased for obtaining the use of a voice channel. The priority of a cellular phone to obtain services may be increased, for example, by reducing wait time during the call request.

In certain situations, the call request may be automatically initiated in response to an emergency. A call request may be automatically initiated by a vehicle-mounted mobile phone when, for example, an on-board air bag is deployed. Information on the geographical location of the mobile vehicle, as determined by an on-board GPS system, may be included with the call request.

When a vehicle is stationary or moving very slowly, for example, during an emergency or while in slow traffic, it may be determined that the vehicle is stationary or moving within a vehicle speed range and the second control channel of the home carrier may be selected. The vehicle speed range may be between, for example, zero and ten miles per hour.

Another aspect of the current invention is a computer usable medium, including a program for bypassing a blocked voice channel of a mobile phone system.

The program may include computer program code for initiating a call request from a mobile phone. The program may include computer program code for scanning a plurality of control channels of a home carrier. The program may include computer program code for measuring the signal strength on each of the control channels, and ranking the control channels according to the signal strength. The program may also include computer program code for requesting service access on the strongest control channel of the home carrier. For instances when the voice channel is blocked, the program may include computer program code indicating no availability of a voice channel. The program may contain computer program code for selecting the second strongest control channel of the home carrier, and requesting service access on that control channel.

For instances when the second strongest control channel is blocked and no voice channel is available, the program may include computer program code for selecting the next strongest control channel of the home carrier and requesting service access on that channel. If this control channel is also blocked and no voice channel is available, each of the subsequent control channels may be selected and service access requested, until all control channels of the home carrier have received requests.

The program may include computer program code for increasing priority for emergency services. The program may also include computer program code for automatically initiating a call request in response to an emergency. The emergency may be indicated, for example, by the deployment of an on-board air bag of a mobile vehicle. The call request may include the geographical location of a mobile vehicle as indicated, for example, by an on-board GPS system. The program may include computer program code for determining whether a vehicle carrying the mobile phone is within a predetermined vehicle speed range.

Another aspect of the present invention provides a system for bypassing a blocked voice channel. The system may include a means for initiating a call request from a mobile phone. The system may include a means for scanning a plurality of control channels of the home carrier, and a means for measuring the signal strength of each control channel. The system may include a means for requesting service access on the strongest control channel of the home carrier, and a means for receiving a blocked signal if no voice channels are available on the strongest control channel of the home carrier. The system may include a means for selecting the second strongest control channel of the home carrier, and a means for requesting service access on that control channel.

The system may further include a means for receiving a blocked signal indicating no availability of a voice channel on the second strongest channel. The system may further include a means for selecting the next strongest control channel of the home carrier in response to a blocked signal, and means for requesting service access on the next strongest channel of the home carrier until a voice channel is available or all available control channels of the home carrier are exhausted.

The system may further include a means for initiating a call request from a mobile phone operating in the 800 MHz range, nominally between 824 and 894 MHz. The system may also include a means for increasing priority for emergency services. The system may also include a means for determining whether a vehicle that is carrying the mobile phone is within a vehicle speed range.

The aforementioned, and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
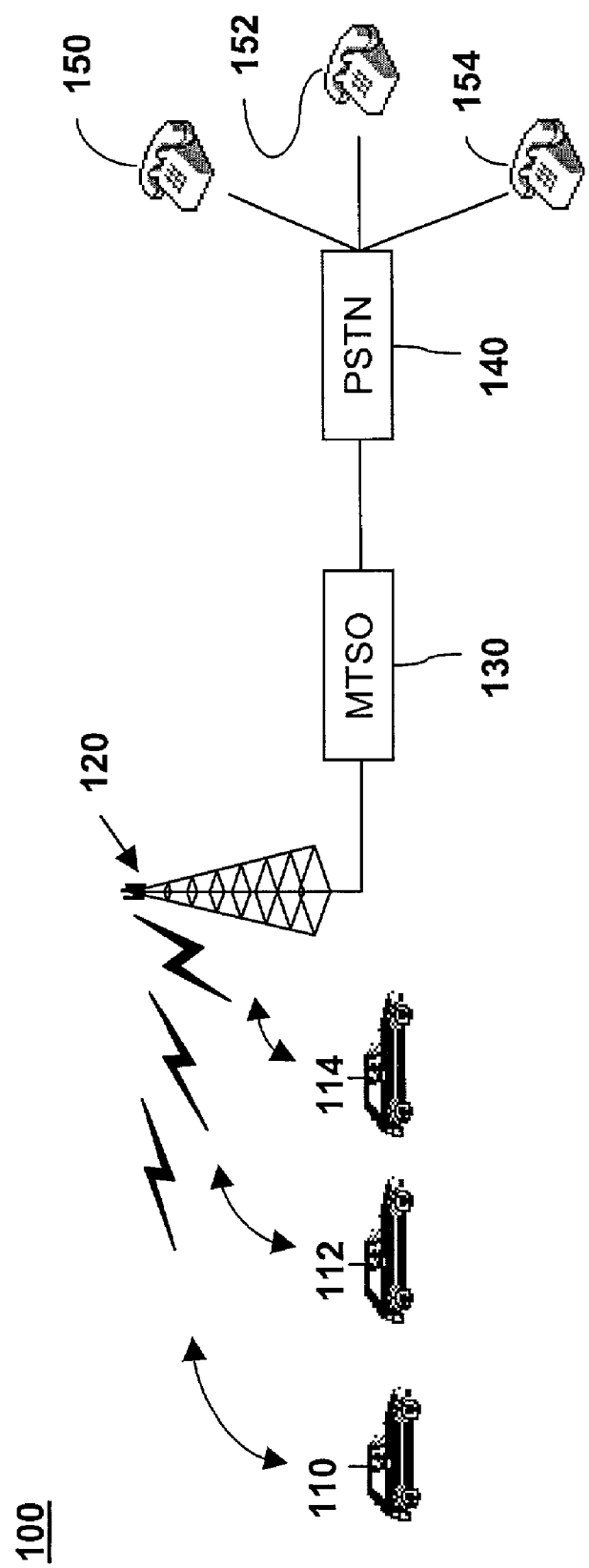
FIG. 1 is a schematic diagram of one embodiment of a system for reducing blocking of cellular phone calls in accordance with the current invention.

FIG. 1 shows one embodiment of a system for reducing blocking of cellular phone calls in accordance with the current invention at 100. The blocked voice channel bypassing system 100 may include one or more mobile clients 110, 112, 114; one or more carrier systems 120; one or more mobile telephone switching offices (MTSO) 130; one or more public switched telephone networks 140; and one or more recipient clients 150, 152, 154.

Mobile client 110, 112, 114 may be, for example, any mobile vehicle equipped with an on-board mobile phone unit. Mobile client 110, 112, 114 may also be, for example, a driver or occupant of a mobile vehicle in possession of a mobile phone unit. Mobile client 110, 112, 114 may also be, for example, any individual or system possessing a mobile phone whether part of a mobile vehicle or not, and who may benefit from a method for reducing blocking of cellular phones. Mobile client 110, 112, 114 may also be, for example, a mobile station or a mobile terminal.

Carrier system 120 is any suitable system for transmitting a signal from mobile client 110, 112, 114 to mobile telephone switching office 130. Carrier system 120 may also transmit a signal from mobile telephone switching office 130 to mobile vehicle client 110, 112, 114. In one embodiment of the invention, carrier system 120 is a wireless carrier system as is well known in the art. Carrier system 120 may be, for example, a cellular phone base station, land station or cell site. Carrier system 120 may contain a plurality of base stations or cell sites.

Mobile telephone switching office 130 is any suitable system for connecting carrier system 120 to public switched telephone network 140. Mobile telephone switching office 130 may also connect public switched telephone network 140 to carrier system 120. Mobile telephone switching office 130 may contain, for example, suitable hardware and software for connecting carrier system 120 to public switched network 140. Mobile telephone switching office 130 may further contain, for example, suitable hardware and software for connecting mobile client 110, 112, 114 to recipient client 150, 152, 154.

Mobile client 110, 112, 114, carrier system 120 and mobile telephone switching office 130, operating in conjunction with each other, may form a mobile or cellular phone system. The cellular phone system may be, for example, an analog cellular phone system. The analog cellular phone system may operate, for example, on a prescribed band between approximately 824 MHz and 894 MHz.

Public switched telephone network 140 is any suitable system for connecting mobile telephone switching office 130 to recipient clients 150, 152, 154. Connections between mobile switching office 130 and public switched telephone network 140 may include one or more media for transmission of signals. Media for transmission of signals may include, for example, electrical wire, optical fiber, or radio frequency links. Connections between public switched telephone network 140 and recipient clients 150, 152, 154 may also include one or more media for transmission of signals.

Recipient clients 150, 152, 154 are equipped to communicate with public switched telephone network 140. Recipient clients 150, 152, 154 may be, for example, stationary phones. Recipient clients 150, 152, 154 may also be, for example, mobile or cellular phones. Recipient clients 150, 152, 154 may also be, for example, any individual or system with hardware and software capable of communicating with public switched telephone network 140.

Mobile client 110, 112, 114 may wish to connect with recipient client 150, 152, 154. Depending on availability of communication channels through carrier 120, mobile telephone switching office 130 and public switched telephone network 140, mobile client 110, 112, 114 may or may not be able to connect and communicate with recipient client 150.

Figure 2:
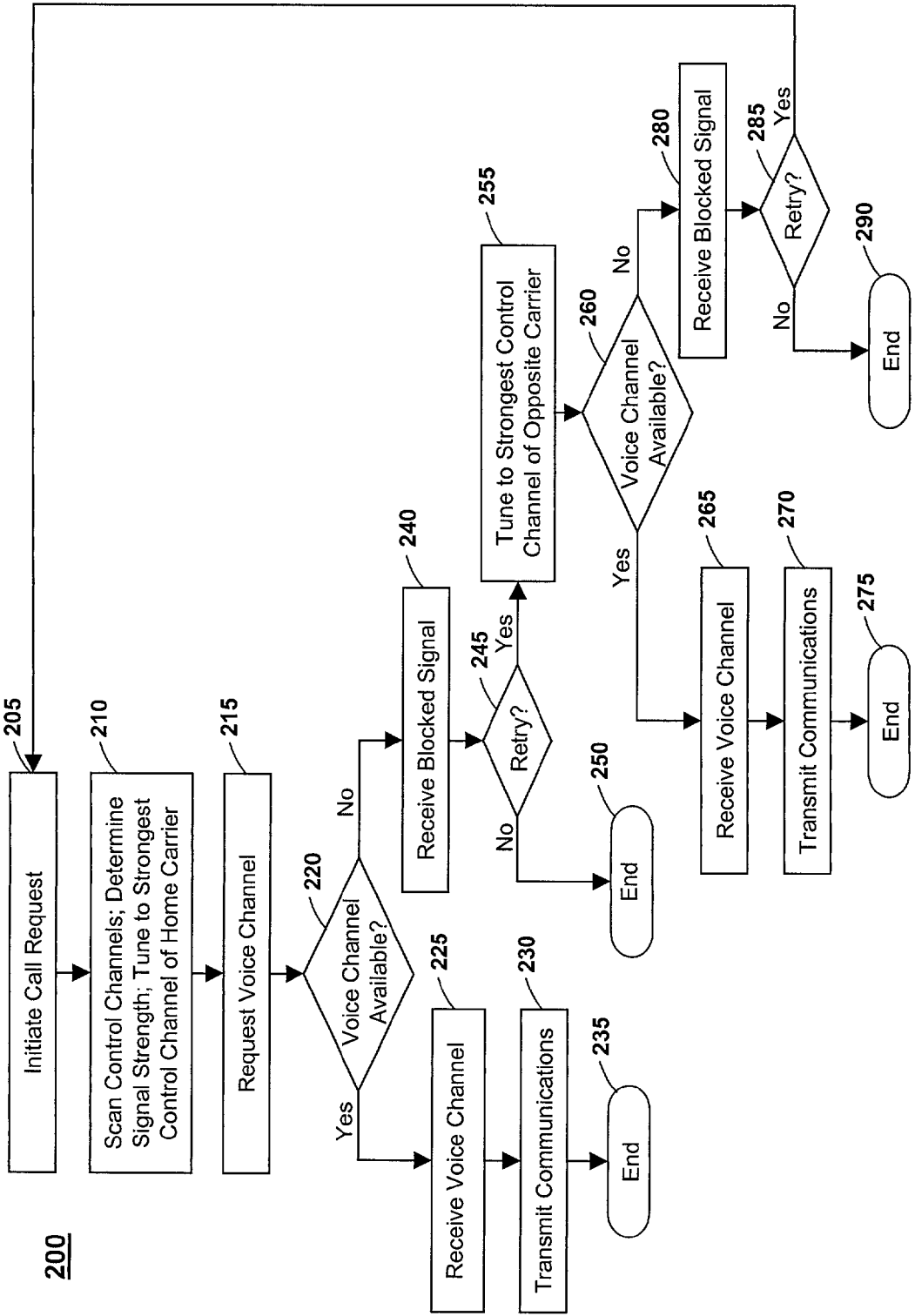
FIG. 2 is a flow diagram of a method currently used for overcoming blocked phone calls in a mobile phone system.

FIG. 2 shows a flow diagram of a method currently used for overcoming blocked phone calls in a mobile phone system at 200. Salient characteristics of this method are shown in the flow diagram and described herein. Details of the method may be described, for example, in the Electronics Industry Association Interim Specification IS-91 (EIA IS-91).

As can be seen at block 205, a mobile client 110, 112, 114 may initiate a call request. Initiating a call request may begin, for example, by turning on power to a mobile phone. After a series of housekeeping chores including receiving, decoding and enacting on messages sent by the mobile telephone switching office 130, the cellular phone may scan a prescribed set of control channels of a home carrier located at specific frequencies within the operating band as seen at block 210. The home carrier may be, for example, one of two carriers utilizing physical channels within the operating band. The home carrier may be, for example, the service carrier to which the cellular phone user is subscribed. The second carrier, referred to as the opposite carrier, may also have a prescribed set of control channels within the operating band. The cellular phone may tune to each control channel and determine the strength of the radio frequency signal at the associated control channel frequency. Tuning to a control channel may be accomplished, for example, in conjunction with a frequency synthesis circuit, as is understood in the art. The signal strength may be measured, for example, with any suitable radio frequency detector and peak signal detector. The cellular phone may then tune to the strongest control channel of the home carrier for idling, registration, authentication or other control functions.

Mobile client 110, 112, 114 may queue in a phone number of a recipient client 150, 152, 154, and after an exchange of transmissions, request a voice channel to execute the call, as seen at block 215. A voice channel may or may not be available, as indicated at block 220. If a voice channel is made available to mobile client 110, 112, 114, then the cellular phone may receive information from the home carrier system directing it to a voice channel to which the cellular phone may be tuned, as indicated at block 225. With the voice channel connected, communications may be transmitted between mobile client 110, 112, 114 and recipient client 150, 152, 154 as seen at block 230.

Communications transmitted between mobile client 110, 112, 114 and recipient client 150, 152, 154 may consist of voice telephony. Communications may also include, for example, short message services, paging, voice mail, electronic mail, call forwarding, caller identification, call waiting, conference calling, broadcast messages, voice band data, facsimile data, data transmission services, modem access, direct access to computer networks, registration, authentication and access to emergency services.

Upon completion of transmissions between mobile client 110, 112, 114 and recipient client 150, 152, 154, the call may be completed and the physical connection relinquished as seen at block 235.

If a voice channel is not available, mobile client 110, 112, 114 may receive a blocked signal as seen at block 240, and the call is blocked. If the cellular client is unable to receive an available voice channel as seen at block 245, then the call request may end as seen at block 250. However, if mobile client 110, 112, 114 allows, the phone may tune to the strongest control channel of the opposite carrier as seen at block 255. If a voice channel is available as seen at block 260, mobile client 110, 112, 114 may receive and tune to a voice channel as seen at block 265. Mobile client 110, 112, 114 may now be connected to recipient client 150, 152, 154 and transmit communications using the voice channel, as seen at block 270. Upon completion of transmissions between mobile client 110, 112, 114 and recipient client 150, 152, 154, the call may be completed and the physical connection released as seen at block 275.

In instances where a voice channel is unavailable from the opposite carrier, mobile client 110, 112, 114 may receive a blocked signal as seen at block 280, and the call is blocked. As seen at block 285, if mobile client 110, 112, 114 is unable to receive an available voice channel, for example, when no voice channels are available with the opposite carrier, then the call request may end as seen at block 290. The call request may also end, for example, if a prescribed amount of time has passed without a voice channel being made available by the opposite carrier or if a prescribed number of attempts is made by mobile client 110, 112, 114 to procure a channel. The call request may also end, for example, if the opposite carrier has no agreement in place with the home carrier to accept the request for service access, or if a certain number of voice channels in the cell are being reserved for use by other mobile clients that may enter the cell. If mobile client 110, 112, 114 continues attempting to procure a voice channel as seen at block 285, then a new call request is initiated as seen at block 205. Otherwise, the call request is unsuccessfully completed and ended as seen at block 290.

Figure 3:
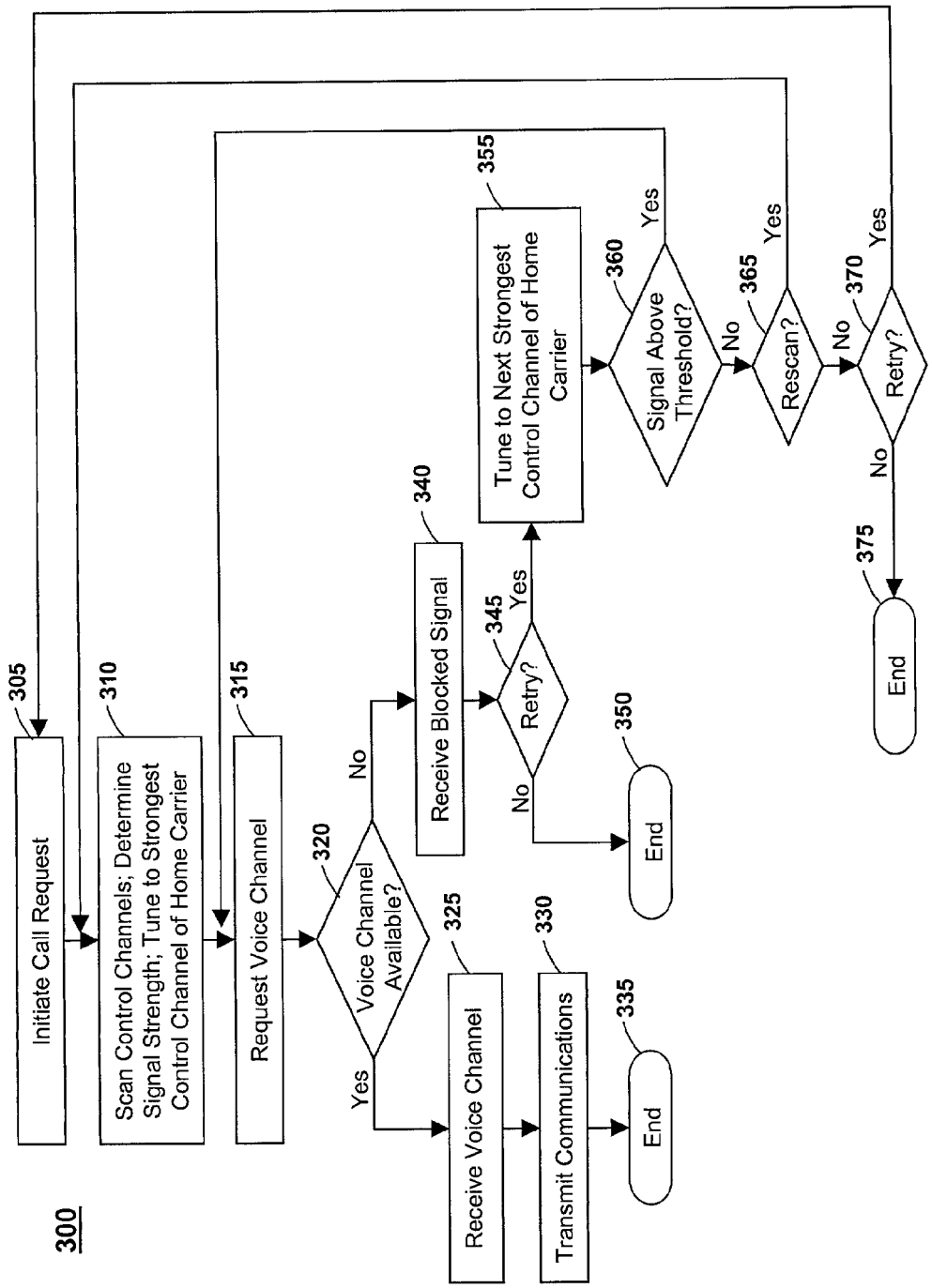
FIG. 3 is a flow diagram of one embodiment of a method for overcoming blocked calls in a mobile phone system in accordance with the current invention.

An alternative method to overcome a blocked call in a cellular phone system is shown in FIG. 3.

FIG. 3 shows a flow diagram of one embodiment of a method for overcoming blocked calls in a mobile phone system in accordance with the current invention at 300. In a fashion similar to the method described in FIG. 2, mobile client 110, 112, 114 may initiate a call request as seen at block 305. Mobile client 110, 112, 114 may scan control channels of the home carrier as seen at block 310. The signal strengths of each control channel are measured, and mobile client 110, 112, 114 may tune to the control channel with the highest signal strength as seen at block 315. Mobile client 110, 112, 114 may request a voice channel from the home carrier. If a voice channel is available, as seen at block 320, mobile client 110, 112, 114 receives a voice channel as seen at block 325. Mobile client 110, 112, 114 may be physically connected to recipient client 150, 152, 154, and any communications between mobile client 110, 112, 114 and recipient client 150, 152, 154 may be transmitted as seen at block 330. As seen at block 335, the call may be ended when all communications are transmitted, and the voice channel may be relinquished.

If mobile client 110, 112, 114 receives a blocked signal as seen at block 340, mobile client 110, 112, 114 may wish to retry making a call request. If mobile client 110, 112, 114 does not wish to retry as seen at block 345, then the call request may be ended as seen at block 350. If mobile client 110, 112, 114 wishes to retry as seen at block 345, then the call request may proceed according to an alternative method in accordance with the current invention.

In one embodiment of the current invention, blocked mobile client 110, 112, 114 may tune to the second strongest control channel of the home carrier, as seen at block 355. As seen at block 360, if the signal of the second strongest control channel of the home carrier is above a threshold value, mobile client 110, 112, 114 may request a voice channel using the second strongest channel of the home carrier, as seen at block 315. This procedure may be repeated for all control channels with signal strength above a threshold value, until all possible control channels of the home carrier have been exhausted. The control channels of the home carrier may be emanating from a base station tower in closest proximity to the mobile phone. Alternatively, the control channels of the home carrier may be emanating from a more distant base station tower. Or, the control channels may be emanating from a combination of close and distant base station towers.

As seen at block 365, if the signal from the second strongest control channel or any lesser strength control channels of the home carrier are not above a threshold value and no voice channel has been made available, then mobile client 110, 112, 114 may elect to rescan all prescribed control channels of the home carrier, as seen at block 310. If mobile client 110, 112, 114 does not elect to rescan all prescribed control channels of the home carrier as seen at block 365, then mobile client 110, 112, 114 may elect to retry the call request, as seen at block 370, and re-initiate a call request as seen at block 305. If mobile client 110, 112, 114 does not elect to retry as seen at block 370, then the call request may be ended as seen at block 375.

Mobile client 110, 112, 114 may overcome a blocked call using the embodiment of the current invention described at 300. Alternatively, mobile client 110, 112, 114 may further elect to request a call from the opposite carrier in accordance with the method of FIG. 2, in instances where the embodiment of the current invention described at 300 is unsuccessful in acquiring the services of the home carrier.

In another embodiment of the current invention, mobile client 110, 112, 114 may need high priority in procuring a voice channel in cases of emergency. Emergency situations may occur, for example, during a high-speed traffic accident involving one or more mobile vehicles. A call may be needed to notify emergency response personnel. In some situations, the call may be automatically placed. A mobile vehicle, for example, may be outfitted with a system containing a mobile phone, a GPS system, and an air bag deployment sensor wherein an emergency call is automatically placed upon deployment of the air bag, giving, for example, the time, location and direction of travel of the impacted vehicle.

Increased priority in placing a call may be obtained, for example, by using the embodiment of the current invention described at 300. In another embodiment, increased priority in placing a call over a mobile phone system may be obtained, for example, by decreasing wait times, shortening time windows for random retries, reducing internal timer values, reducing a maximum number of busy occurrences, or reducing a maximum number of seizure attempts prescribed by the mobile phone system when requesting service access or requesting a voice channel, as occurring, for example, at blocks 220, 260, and 320. Increased priority may also be obtained, for example, by reducing the maximum number of busy occurrences prior to receiving a blocked call signal as seen at block 340. Increasing priority may also be obtained, for example, by reducing the maximum number of unsuccessful seizure attempts prior to receiving a blocked call signal as seen at block 340. Increasing priority may also be obtained, for example, by reducing the time set in an access timer. Increasing priority may also be obtained, for example, by shortening the time period for a random delay prior to a call attempt.

In another embodiment of the present invention, a mobile vehicle carrying the mobile phone may be stationary, such as after an accident, or in slowly moving traffic, such as in traffic congestion. In these instances, it may be determined that the vehicle is moving within a vehicle speed range. The vehicle speed range may be determined, for example, by suitable hardware and software on the vehicle. The vehicle speed range may be predetermined, for example, by a default value. The vehicle speed range may be, for example, zero to ten miles per hour. The vehicle speed range may be determined over a period of time, for example, by the vehicle not exceeding the range over the period of time, or by the average speed of the vehicle not exceeding the range over the period of time. Increased priority may be given to a call request from the mobile phone. If the vehicle carrying the mobile phone is moving within the predetermined vehicle speed range, the second control channel of the home carrier may be selected to bypass a blocked voice channel of the mobile phone system.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

The invention claimed is:

1. A method of bypassing a blocked voice channel of a mobile phone system, comprising:
   initiating a call request from a mobile phone;
   scanning a plurality of control channels of a carrier;
   measuring a signal strength of each control channel;
   requesting service access on a first control channel of the carrier based on the signal strength;
   receiving a blocked signal indicating no availability of a voice channel on the first control channel of the first carrier;
   determining whether a vehicle carrying the mobile phone is within a predetermined vehicle speed range;
   selecting a second control channel of the carrier in response to receiving the blocked signal when the vehicle is within the predetermined vehicle speed range, based on the signal strength; and
   requesting service access on the second control channel of the carrier.

2. The method of claim 1 wherein the mobile phone system is an analog cellular phone system.

3. The method of claim 2 wherein the analog cellular phone system operates within a prescribed band between nominally 824.04 MHz and 893.97 MHz.

4. The method of claim 1 further comprising:
   receiving a blocked signal indicating no availability of a voice channel on the second control channel of the carrier;
   selecting a next strongest control channel of the carrier in response to the blocked signal based on the signal strength; and
   requesting service access on the next strongest control channel of the carrier.

5. The method of claim 1 wherein the voice channel uses a service selected from a group consisting of voice telephony, short messaging, paging, voice mail, electronic mail, call forwarding, caller identification, call waiting, conference calling, broadcast messages, voice band data, fascimile data, data transmission, modem access, direct access to computer networks, registration, authentication and access to emergency services.

6. The method of claim 1 further comprising:
   increasing priority for emergency services.

7. The method of claim 6 wherein the priority for emergency services is increased by reducing wait time during the call request.

8. The method of claim 1 wherein the call request is automatically initiated in response to an emergency.

9. The method of claim 8 wherein the emergency is indicated by the deployment of an air bag on a mobile vehicle carrying the mobile phone.

10. The method of claim 8 wherein the call request includes a geographical location of a mobile vehicle.

11. The method of claim 1 wherein the predetermined vehicle speed range is between about 0 and 10 miles per hour.

12. The method of claim 1, wherein the carrier is a home carrier.

13. A computer usable medium including a program for bypassing a blocked voice channel of a mobile phone system, comprising:
   computer program code for initiating a call request from a mobile phone;
   computer program code for scanning a plurality of control channels of a carrier;
   computer program code for measuring a signal strength of each control channel;
   computer program code for requesting service access an a first control channel of the carrier based on the signal strength;
   computer program code for receiving a blocked signal indicating no availability of a voice channel on the first control channel of the carrier;
   computer program code for determining whether a vehicle carrying the mobile phone is within a predetermined vehicle speed range;
   computer program code for selecting a second control channel of the carrier in response to receiving the blocked signal when the vehicle is within the predetermined vehicle speed range, based on the signal strength; and
   computer program code for requesting service access on the second control channel of the carrier.

14. The computer usable medium of claim 13, further comprising:
   computer program code for receiving a blocked signal indicating no availability of a voice channel on the second control channel of the carrier;
   computer program code for selecting a next strongest control channel of the carrier in response to the blocked signal based on the signal strength; and
   computer program code for requesting service access on the next strongest control channel of the carrier.

15. The computer usable medium of claim 13, further comprising:
   computer program code for increasing priority for emergency services.

16. The computer usable medium of claim 13, further comprising:
   computer program code for automatically initiating the call request in response to an emergency.

17. The computer usable medium of claim 16 wherein the emergency is indicated by the deployment of an on-board air bag.

18. The computer usable medium of claim 16 wherein the call request includes a geographical location of a mobile vehicle.

19. The computer reusable medium of claim 13, wherein the carrier is a home carrier.

20. A blocked voice channel bypassing system comprising:
   means for initiating a call request from a mobile phone;
   means for scanning a plurality of control channels of carrier;
   means for measuring a signal strength of each control channel;
   means for requesting service access on a first control channel of the carrier based on the signal strength;
   means for receiving a blocked signal indicating no availability of a voice channel on the first control channel of the carrier;
   means for determining whether a vehicle carrying mobile phone is within a vehicle speed range; and
   means for selecting a second control channel of the carrier in response to receiving the blocked signal when the vehicle is within the predetermined vehicle speed range, based on the signal strength; and
   means for requesting service access on the second control channel of the carrier.

21. The system of claim 20 further comprising:
   means for receiving a blocked signal indicating no availability of a voice channel on the second control channel of the carrier;
   means for selecting a next strongest control channel of the carrier in response to the blocked signal based on the signal strength; and
   means for requesting service access on the next strongest control channel of the carrier.

22. The system of claim 20 wherein the means for initiating a call request from a mobile phone includes an analog cellular phone system operating within a prescribed band between nominally 824.04 MHz and 893.97 MHz.

23. The system of claim 20 further comprising: means for increasing priority for emergency services.

24. The system of claim 20, wherein the carrier is a home carrier.

* * * * *